Patented Feb. 4, 1941

2,230,753

UNITED STATES PATENT OFFICE 2,230,753

UNSATURATED ETHYLAMINE DERIVATIVES

Wilfrid Klavehn, Schwetzingen, and Anton Wolf, Heidelberg, Germany, assignors to E. Bilhuber Corporation No Drawing. Application February 12, 1938, Serial No. 190,328. In Germany February 15, 1937

3 Claims. (Cl. 260—583)

German Patent No. 617,596 has as its object a process for the production of secondary and tertiary derivatives of amino-6-methyl-2-heptene-2, which are characterised by a valuable anti-spasmodic action. These bases are obtained by treating amino-6-methyl-2-heptene-2 or secondary derivatives thereof with alkylating agents. If desired the production of amino-6-methyl-2-heptene-2 or secondary derivatives thereof and the alkylation can be combined into one process.

The invention relates to other unsaturated derivatives of ethylamine of the general formula

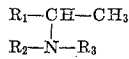

wherein $R_1$ is an alkenyl radical with 4 carbon atoms in a straight or branched chain, $R_2$ is hydrogen, or an alkyl containing at least two carbon atoms, or alkenyl radicle, and $R_3$ is an alkyl, alkenyl, cycloalkyl or aralkyl radicle. These compounds also have favourable anti-spasmodic properties.

$R_2$ is hydrogen, or an alkyl radicle, for example ethyl, propyl, isopropyl, butyl, isobutyl, amyl, isoamyl etc. or an alkenyl radicle for example allyl, butenyl etc.

$R_3$ is likewise an alkyl, alkenyl, cycloalkyl or aralkyl radicle, for example of the type given for $R_2$.

The production of the new compounds is carried out by treating the alkenyl-ethylamine of the formula

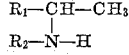

wherein $R_1$ is an alkenyl radicle with at least 4 carbon atoms in a straight or branched chain with the exception of methyl-2-pentene-2-yl, and $R_2$ is hydrogen, or an alkyl, or alkenyl radicle, with agents which yield hydrocarbon radicles, i. e. with alkylating, alkenylating, cycloalkylating or aralkylating agents. If desired the production of the aforenamed alkenylethylamine, for example by the condensation of the corresponding alkenylmethylketone can be carried out at the same time as the alkylation.

As alkylating agents there may be used for example, dimethyl sulphate or diethyl sulphate. Another group of alkylating agents are the alkyl halides such as ethyl-, propyl-, isopropyl-, butyl-, isobutyl- or isoamyl-halides, for example the chloride or bromide. Finally the alkylation of the initial amine can be carried out by condensation with aldehydes or ketones with simultaneous reduction.

For the production of cycloalkyl derivatives of the initial amine known cycloalkylating agents are used, for example the initial amine may be condensed with cycloaldehydes or cycloketones and simultaneously reduced.

Finally for the production of aralkyl derivatives the initial amine may be treated for example with benzyl chloride or condensed with benzaldehyde and reduced.

Examples 1. 30 grams of amino-5-hexene-1,

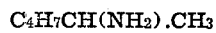

were condensed with 37.5 grams of benzaldehyde on a water bath. After the separation of the water which is produced, solution was effected in 300 ccs. of absolute alcohol and this solution was heated to boiling and in the course of 1 to 2 hours 75 grams of sodium and a further 500 ccs. of absolute alcohol were added. The reaction mixture was treated with steam, the alcoholic distillate was treated with dilute mineral acid and the alcohol was again driven off with steam. On the addition of alkali the base separated out.

The benzyl amino-5-hexene-1, $C_{13}H_{19}N$ obtained is an oil with a characteristic odour which boils at 136 to 138° C. under 12 mms. pressure. The hydrochloride which is easily soluble in water crystallises from alcohol-ether in scales having a freezing point of 116 to 118° C. The yield was 80% of the theoretical.

2. 34 grams of methylamino-5-hexene-1,

were heated with 12.6 grams of benzyl chloride under a reflux condenser. After the reaction had taken place the reaction mixture was taken up in dilute mineral acid and the aqueous solution was shaken with ether to remove the non-basic constituents. On the addition of alkali the base mixture separated out.

By distillation under reduced pressure there distilled as first runnings the initial material which was used in excess. At 132 to 134° C. under 12 mms. pressure tertiary methyl-benzyl-amino-5-hexene-1, $C_{14}H_{21}N$ distilled as a colourless oil having slight characteristic odour. The yield was 80 to 90% of the theoretical.

What we claim is:

1. Unsaturated derivatives of ethylamine having the general formula

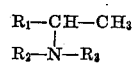

wherein $R_1$ is an alkenyl radical containing four carbon atoms, $R_2$ is a radical selected from the group consisting of hydrogen, and lower alkyl radicals containing at least two carbon atoms, and $R_3$ is a radical selected from the group consisting of lower alkyl, lower alkenyl, cycloalkyl and phenyl-lower alkyl radicals.

2. Benzylamino-5-hexene-1.

3. Tertiary methyl-benzyl-amino-5-hexene-1.

WILFRID KLAVEHN.
ANTON WOLF.